(12) United States Patent
Aizawa et al.

(10) Patent No.: US 11,664,135 B2
(45) Date of Patent: May 30, 2023

(54) COATED CARBON NANOTUBE WIRE FOR COIL, COIL USING COATED CARBON NANOTUBE WIRE FOR COIL, AND METHOD FOR MANUFACTURING COATED CARBON NANOTUBE WIRE COIL

(71) Applicant: Furukawa Electric Co., Ltd., Tokyo (JP)

(72) Inventors: Hideki Aizawa, Tokyo (JP); Satoshi Yamashita, Tokyo (JP); Kazutomi Miyoshi, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 155 days.

(21) Appl. No.: 17/037,443

(22) Filed: Sep. 29, 2020

(65) Prior Publication Data

US 2021/0035706 A1    Feb. 4, 2021

Related U.S. Application Data

(63) Continuation of application No. PCT/JP2019/014404, filed on Apr. 1, 2019.

(30) Foreign Application Priority Data

Mar. 30, 2018    (JP) .............................. JP2018-069824

(51) Int. Cl.
*H01B 5/08*    (2006.01)
*H01B 1/04*    (2006.01)
(Continued)

(52) U.S. Cl.
CPC ................. *H01B 5/08* (2013.01); *H01B 1/04* (2013.01); *H01F 41/04* (2013.01); *H01F 5/06* (2013.01); *H02K 3/02* (2013.01)

(58) Field of Classification Search
None
See application file for complete search history.

(56) References Cited

U.S. PATENT DOCUMENTS

| 7,323,157 B2 | 1/2008 | Kinloch et al. |
| 8,926,933 B2 | 1/2015 | Zhang et al. |

(Continued)

FOREIGN PATENT DOCUMENTS

| AU | 2001237491 B2 * | 5/2005 | ............. B82Y 15/00 |
| CA | 3085017 A1 * | 6/2019 | ............. B62H 5/003 |

(Continued)

OTHER PUBLICATIONS

English Translation] "Fundamentals of Electromagnetism" Shandong Education Press, Feb. 1983; pp. all.

(Continued)

*Primary Examiner* — Krystal Robinson
(74) *Attorney, Agent, or Firm* — Dorsey & Whitney LLP

(57) ABSTRACT

A coated carbon nanotube wire for a coil includes: a carbon nanotube wire, the carbon nanotube wire being composed of a plurality of carbon nanotube aggregates each constituted of a plurality of carbon nanotubes, or being composed of a plurality of carbon nanotube element wires each constituted of a plurality of carbon nanotubes; and a coating layer coating the carbon nanotube wire, wherein each of the carbon nanotube aggregates contacts one or more other adjacent carbon nanotube aggregates, or each of the carbon nanotube element wires contacts one or more other adjacent carbon nanotube element wires.

18 Claims, 3 Drawing Sheets

(51) Int. Cl.
*H01F 41/04* (2006.01)
*H01F 5/06* (2006.01)
*H02K 3/02* (2006.01)

(56) References Cited

U.S. PATENT DOCUMENTS

| | | | |
|---|---|---|---|
| 9,424,960 | B2 | 8/2016 | Rikihisa et al. |
| 9,481,949 | B2 | 11/2016 | Zhang et al. |
| 9,512,545 | B2 | 12/2016 | Zhang et al. |
| 9,605,363 | B2 | 3/2017 | Zhang et al. |
| 9,631,301 | B2 | 4/2017 | Zhang et al. |
| 9,688,536 | B2 | 6/2017 | Zhang et al. |
| 9,815,699 | B1 | 11/2017 | Zhang et al. |
| 9,845,554 | B2 | 12/2017 | Zhang et al. |
| 9,862,607 | B2 | 1/2018 | Zhang et al. |
| 9,944,529 | B2 | 4/2018 | Zhang et al. |
| 10,196,271 | B2 | 2/2019 | Zhang et al. |
| 2003/0141101 | A1* | 7/2003 | Mima ............... H01B 5/12 174/128.1 |
| 2005/0006801 | A1 | 1/2005 | Kinloch et al. |
| 2011/0018539 | A1* | 1/2011 | Viswanathan ... G01R 33/34007 324/318 |
| 2011/0288388 | A1* | 11/2011 | Shah ................ A61N 1/05 29/874 |
| 2014/0039309 | A1 | 2/2014 | Harris et al. |
| 2014/0046291 | A1 | 2/2014 | Harris et al. |
| 2014/0084219 | A1 | 3/2014 | Zhao et al. |
| 2014/0363669 | A1 | 12/2014 | Otto et al. |
| 2016/0003016 | A1* | 1/2016 | Chang ............... E21B 43/128 166/66.4 |
| 2016/0135687 | A1 | 5/2016 | Harris et al. |
| 2016/0233009 | A1 | 8/2016 | Mieno et al. |
| 2020/0265968 | A1 | 8/2020 | Aizawa et al. |

FOREIGN PATENT DOCUMENTS

| | | | | |
|---|---|---|---|---|
| CN | 102110501 | B | 11/2012 | |
| EP | 2322709 | A1 * | 5/2011 | ........... D06M 10/02 |
| EP | 3703084 | A1 | 9/2020 | |
| JP | 2008108583 | A | 5/2008 | |
| JP | 5131571 | B2 | 11/2012 | |
| JP | 5135620 | B2 | 11/2012 | |
| JP | 2013047163 | A | 3/2013 | |
| JP | 5288359 | B2 | 6/2013 | |
| JP | 2013138594 | A | 7/2013 | |
| JP | 5350635 | B2 | 8/2013 | |
| JP | 5590603 | B2 | 8/2014 | |
| JP | 2014530964 | A | 11/2014 | |
| JP | 2015065081 | A | 4/2015 | |
| JP | 5819888 | B2 | 10/2015 | |
| JP | 5990202 | B2 | 8/2016 | |
| JP | 2017037896 | A | 2/2017 | |
| JP | 2017171545 | A | 9/2017 | |
| WO | 2012118836 | A1 | 9/2012 | |
| WO | 2013045936 | A1 | 4/2013 | |

OTHER PUBLICATIONS

English Translation] Second Office Action dated Apr. 2, 2022 in CN application No. 201980022784.9; pp. all.

EESR dated Dec. 10, 2021 for European Patent Application No. 19776264.4; pp. all.

Kurzepa, Lukasz, et al., "Replacing Copper Wires with Carbon Nanotube Wires in Electrical Transformers", Advanced Functional Materials, Wiley—V C H Verlag GMBH & Co. KGAA, DE, vol. 24, No. 5 XP001588511 www.MaterialsViews.com, Feb. 5, 2014, pp. 619-624.

International Search Report and Written Opinion (EN translation of ISR only) for Application No. PCT/JP2019/014404, dated Jun. 18, 2019.

English translation of International Preliminary Report on Patentability for Application No. PCT/JP2019/014404, dated Oct. 6, 2020.

English translation of Written Opinion for Application No. PCT/JP2019/014404, dated Jun. 18, 2019.

English Translation] Decision of Rejection dated Nov. 8, 2022 in the JP application No. 2020-509387; pp. all.

English Translation] Notice of Reasons for Refusal dated Aug. 23, 2022 in JP application No. 2020-509387; pp. all.

[English Translation] Reconsideration Report by Examiner before Appeal dated Mar. 6, 2023 for JP Application No. 2020-509387; pp. all.

* cited by examiner

COATED CARBON NANOTUBE WIRE FOR COIL, COIL USING COATED CARBON NANOTUBE WIRE FOR COIL, AND METHOD FOR MANUFACTURING COATED CARBON NANOTUBE WIRE COIL

CROSS REFERENCE TO RELATED APPLICATIONS

The present application is a continuation application of International Patent Application No. PCT/JP2019/014404 filed on Apr. 1, 2019, which claims the benefit of Japanese Patent Application No. 2018-069824, filed on Mar. 30, 2018. The contents of these applications are incorporated herein by reference in their entirety.

BACKGROUND

Technical Field

The present disclosure relates to a coated carbon nanotube wire used for a coil obtained by coating a carbon nanotube wire constituted of a plurality of carbon nanotubes with a coating material, a coil using the coated carbon nanotube wire, and a method for manufacturing the coil using the coated carbon nanotube wire.

Background

Coils are used for various electrically powered devices such as a motor which is energized with high frequency current. A coil is prepared by winding a wire to be wound having a conductor wire into a spiral shape. In view of downsizing an electrically powered device and improving the power, it is occasionally requested to make windings with distances between adjacent turns made narrow. Nevertheless, when wound conductor wires are arranged to be close between themselves, eddy currents arise on the conductor wires, the amount of eddy currents increases, as a result, a current loss due to the eddy currents arising on the conductor wires becomes large, and a current loss of the coil increases.

It is therefore proposed to reduce eddy currents with a wire for a coil, including a conductor wire and a magnetic substance layer formed of a magnetic material on the periphery of the conductor wire (Japanese Patent Application Publication No. 2017-37896).

Meanwhile, in view of improving power of an electrically powered device, it is required to thicken a conductor wire and to improve a sectional area factor (lamination factor) of the conductor wire. Nevertheless, when an electric wire material is processed into windings, thickening of one conductor wire is to reach some limit and eddy currents accordingly increase. It is therefore proposed to divide a conductor wire for forming the coil into some segments for workability into windings and reduction of eddy currents (Japanese Patent Application Publication No. 2013-138594) and to twist thin electric wires together for thickening, each wire including a center conductor and a magnetic layer coating the center conductor (Japanese Patent Application Publication No. 2015-65081).

However, as to Japanese Patent Application Publication No. 2017-37896, in the case of setting a twisted wire using a plurality of wires in order to energize an electrically powered device with high frequency current and to improve the power, it is needed to reduce electroconductivity between the wires twisted together. Hence, in Japanese Patent Application Publication No. 2017-37896, it is needed to form a magnetic substance layer on each of the wires constituting the twisted wire. According to the above, as to Japanese Patent Application Publication No. 2017-37896, there has been a case where sufficient power characteristics cannot be obtained since there is room for improvement on restraining eddy currents due to a sectional area factor (lamination factor) of the conductor wire being low and there is still room for improvement on high frequency characteristics. Moreover, as to Japanese Patent Application Publication No. 2017-37896, since it is needed to form a magnetic substance layer on each of the wires constituting the twisted wire, production costs have been problematically high.

Moreover, in energization with high frequency current, also as to Japanese Patent Application Publication No. 2013-138594, it is needed to coat each of the segmented wires with an insulating layer in order to reduce electroconductivity between the segmented wires, and also as to Japanese Patent Application Publication No. 2015-65081, in the case of twisting wires together in order to restrain eddy currents, it is needed to coat each of the center conductors with a magnetic layer in order to reduce electroconductivity between the wires twisted together. Accordingly, also as to Patent Literatures 2 and 3, there has been a case where sufficient power characteristics cannot be obtained since when restraining eddy currents, there is room for improvement on the lamination factor of conductor wire and there is still room for improvement on high frequency characteristics. Moreover, also as to Patent Literatures 2 and 3, since it is needed to form a coating layer on each of the wires constituting the twisted wire, production costs have been problematically high.

SUMMARY

It is an object of the present disclosure to provide a coated carbon nanotube wire for a coil with which eddy currents are reduced and which is excellent in high-power characteristics.

[1] A coated carbon nanotube wire for a coil, comprising:
a carbon nanotube wire, the carbon nanotube wire being composed of a plurality of carbon nanotube aggregates each constituted of a plurality of carbon nanotubes, or being composed of a plurality of carbon nanotube element wires each constituted of a plurality of carbon nanotubes; and
a coating layer coating the carbon nanotube wire, wherein each of the carbon nanotube aggregates contacts one or more other adjacent carbon nanotube aggregates, or each of the carbon nanotube element wires contacts one or more other adjacent carbon nanotube element wires.

[2] The coated carbon nanotube wire for a coil according to [1], wherein a twisted wire density in the carbon nanotube wire is 0.5 g/cm$^3$ to 2.5 g/cm$^3$.

[3] The coated carbon nanotube wire for a coil according to [1] or [2], wherein a density of the carbon nanotube aggregates or the carbon nanotube element wires in the carbon nanotube wire is 1.1 g/cm$^3$ to 1.8 g/cm$^3$.

[4] The coated carbon nanotube wire for a coil according to [2], wherein the twisted wire density in the carbon nanotube wire is 1.2 g/cm$^3$ to 1.5 g/cm$^3$.

[5] The coated carbon nanotube wire for a coil according to [3], wherein the density of the carbon nanotube aggregates or the carbon nanotube element wires in the carbon nanotube wire is 1.5 g/cm$^3$ to 1.8 g/cm$^3$.

[6] The coated carbon nanotube wire for a coil according to any one of [1] to [5], wherein the number of the carbon nanotube aggregates or the carbon nanotube element wires constituting the carbon nanotube wire is 10 to 1000.

[7] The coated carbon nanotube wire for a coil according to any one of [1] to [6], wherein the number of the carbon nanotube aggregates or the carbon nanotube element wires constituting the carbon nanotube wire is 300 to 600.

[8] The coated carbon nanotube wire for a coil according to any one of [1] to [7], wherein an equivalent circle diameter of the carbon nanotube wire is not smaller than 0.05 mm and not larger than 2.0 mm.

[9] The coated carbon nanotube wire for a coil according to any one of [1] to [8], wherein an equivalent circle diameter of the carbon nanotube wire is not smaller than 0.30 mm and not larger than 1.0 mm.

[10] The coated carbon nanotube wire for a coil according to any one of [1] to [9], wherein a twisting number of the carbon nanotube wire is not less than 1 T/m and not more than 1000 T/m.

[11] The coated carbon nanotube wire for a coil according to any one of [1] to [10], wherein a twisting number of the carbon nanotube wire is not less than 10 T/m and not more than 800 T/m.

[12] A coil using a winding of the coated carbon nanotube wire for a coil according to any one of [1] to [11].

[13] A method for manufacturing a coated carbon nanotube wire coil, comprising:
a step of preparing a carbon nanotube wire from a plurality of carbon nanotube element wires;
a step of preparing a coated carbon nanotube wire by coating the carbon nanotube wire with a coating material; and
a step of winding the coated carbon nanotube wire into a winding.

[14] A method for manufacturing a coated carbon nanotube wire coil, comprising:
a step of coating, with a coating material, a carbon nanotube wire composed of carbon nanotube aggregates each constituted of a plurality of carbon nanotubes or carbon nanotube element wires each constituted of a plurality of carbon nanotubes to prepare a coated carbon nanotube wire; and
a step of winding the coated carbon nanotube wire into a winding.

[15] The method for manufacturing a coated carbon nanotube wire coil according to [14], wherein the number of the carbon nanotube aggregates or the carbon nanotube element wires which are to be twisted together is 10 to 1000.

[16] The method for manufacturing a coated carbon nanotube wire coil according to any one of [13] to [15], wherein an equivalent circle diameter of the carbon nanotube wire is not smaller than 0.05 mm and not larger than 2.0 mm.

[17] The method for manufacturing a coated carbon nanotube wire coil according to any one of [13] to [16], wherein a twisting number of the carbon nanotube wire is not less than 1 T/m and not more than 1000 T/m.

According to aspects of the present disclosure, a coated carbon nanotube wire for a coil with which eddy currents are reduced and which is excellent in high-power characteristics can be obtained.

DETAILED DESCRIPTION

Hereinafter, a coated carbon nanotube wire for a coil according to an embodiment of the present disclosure will be described with use of the drawings.

Figure 1:
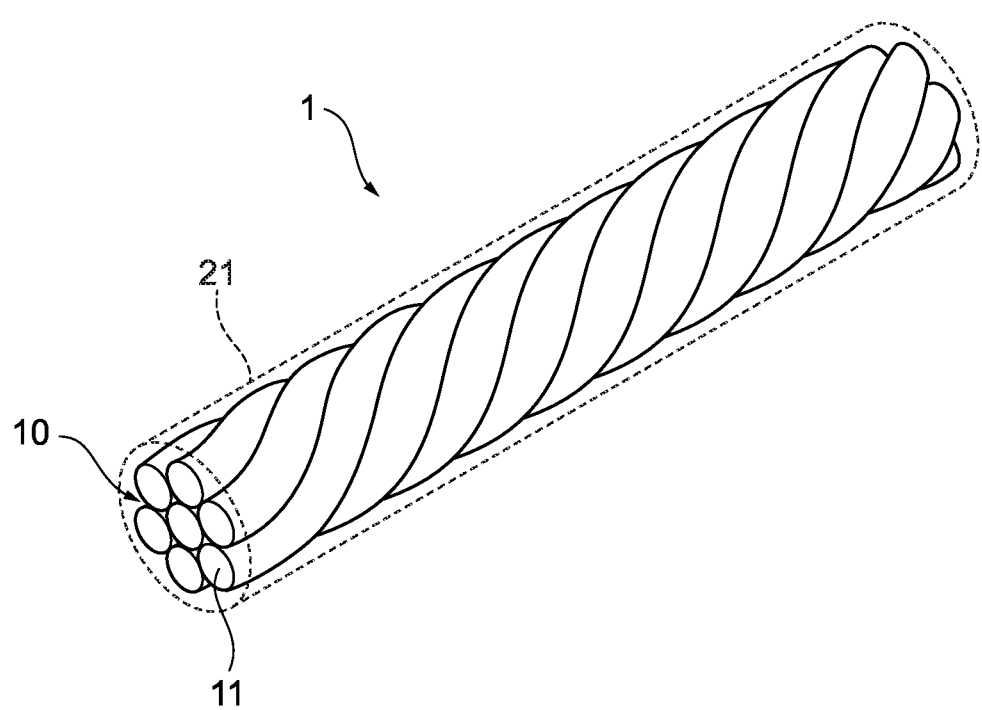
FIG. 1 An explanatory view of a coated carbon nanotube wire for a coil according to an embodiment of the present disclosure.

As shown in FIG. 1, a coated carbon nanotube wire 1 for a coil (hereinafter occasionally referred to as "coated CNT wire 1 for a coil") according to an embodiment of the present disclosure has a configuration in which a peripheral surface of a carbon nanotube wire (hereinafter occasionally referred to as "CNT wire") 10 is coated with a coating layer 21. Namely, coating with the coating layer 21 is done along a longitudinal direction of the CNT wire 10. In the coated CNT wire 1, the whole peripheral surface of the CNT wire 10 is coated with the coating layer 21. Moreover, in the coated CNT wire 1, the coating layer 21 is in a mode of directly contacting the peripheral surface of the CNT wire 10.

The CNT wire 10 is formed by a plurality of carbon nanotube aggregates (hereinafter occasionally referred to as "CNT aggregates") 11 or a plurality of carbon nanotube element wires (hereinafter occasionally referred to as "CNT element wires") 11 being twisted together to be in a form of a twisted wire (the "CNT aggregates 11" and the "CNT element wires 11" are hereinafter occasionally collectively referred to as "CNT element wires etcetera 11"). In the coated CNT wire 1 for a coil in a form of a twisted wire, the CNT element wires etcetera 11 constituting the twisted wire exhibit high electroconductivity in the longitudinal direction, on the other hand, electroconductivity is low between the CNT element wires etcetera 11, hence, conductors are brought close to a state of being separated for each element wire, and hence, eddy currents can be restrained, resulting in being able to obtain a coil capable of restraining a current loss. Note that in FIG. 1, the number of the CNT element wires etcetera 11 is seven for convenience.

In the CNT wire 10, a CNT element wire etcetera 11 contacts other adjacent CNT element wires etcetera 11 not via the coating layer 21. Namely, the CNT element wire etcetera 11 directly contacts the other adjacent CNT element wires etcetera 11. By setting the CNT wire 10 to be in a form of the twisted wire, the CNT wire 10 can be made thick. Moreover, as mentioned later, each CNT element wire etcetera 11 is a wire excellent in electroconductivity in the longitudinal direction, and since the CNT element wire etcetera 11 directly contacts other adjacent CNT element wires etcetera 11, the coated CNT wire 1 for a coil can improve a sectional area factor (lamination factor) of conductors in a cross section in a radial direction.

Figure 2:
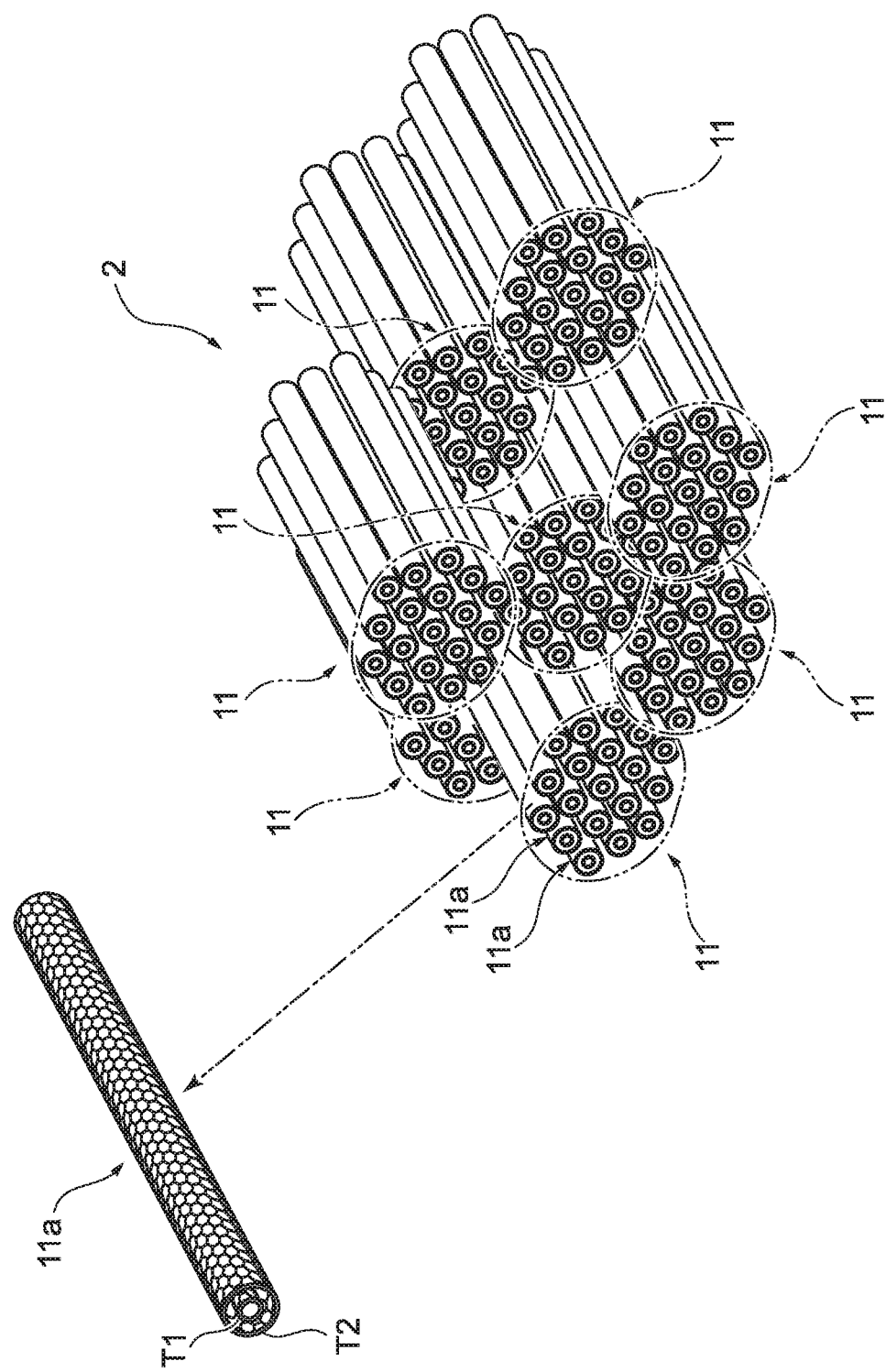
FIG. 2 An explanatory view of a carbon nanotube wire used for a coated carbon nanotube wire for a coil according to an embodiment of the present disclosure.

As shown in FIG. 2, the CNT element wire etcetera 11 used for the coated CNT wire 1 for a coil is constituted of a plurality of carbon nanotubes (hereinafter occasionally referred to as "CNTs") 11a, 11a, . . . each having a wall structure with one or more walls. Herein, the CNT wire means a CNT wire in which a ratio of CNTs is 90 mass % or more. Note that plating and dopants are excluded from calculation of the CNT proportion in the CNT wire. The CNT wire 10 has a configuration in which a plurality of CNT element wires etcetera 11 are twisted together and bundled. Longitudinal directions of the CNT element wires etcetera 11 form the longitudinal direction of the CNT wire 10. Accordingly, each CNT element wire etcetera 11 is linear. The plurality of CNT element wires etcetera 11, 11, . . . in the CNT wire 10 are twisted together at a predetermined twisting number along a center axis of the CNT wire 10 in the longitudinal direction. Accordingly, the plurality of CNT element wires etcetera 11, 11, . . . in the CNT wire 10 are oriented.

The CNT element wire etcetera 11 is a bundle of long CNTs 11a each having a wall structure with one or more walls. Longitudinal directions of the CNTs 11a form a longitudinal direction of the CNT element wire etcetera 11. The plurality of CNTs 11a, 11a, . . . in the CNT element wire etcetera 11 are arranged such that longitudinal axis directions of the CNTs 11a are substantially uniform. Accordingly, the plurality of CNTs 11a, 11a, . . . in the CNT element wire etcetera 11 are oriented. Equivalent circle diameters of the CNT element wires etcetera 11 are exemplarily not smaller than 20 nm and not larger than 1000 nm, among these, the equivalent circle diameter of the CNT aggregate 11 is exemplarily not smaller than 20 nm and not larger than 80 nm, and the equivalent circle diameter of the CNT element wire 11 is exemplarily larger than 80 nm and not larger than 1000 nm. Moreover, a width dimension of the outermost wall of the CNT 11a is exemplarily not smaller than 1.0 nm and not larger than 5.0 nm.

In the coated CNT wire 1 for a coil, each of the CNTs 11a constituting the CNT element wires etcetera 11 is a cylindrical body having any of a single-walled structure and a multi-walled structure which are called a SWNT (single-walled nanotube) and a MWNT (multi-walled nanotube), respectively. While in FIG. 2, only CNTs 11a having double-walled structures are presented, CNTs each having a wall structure having a structure with three or more walls and/or CNTs each having a wall structure having a structure with a single wall may also be contained in the CNT element wire etcetera 11, which may be formed of CNTs each having a wall structure having a structure with three or more walls or CNTs each having a wall structure having a structure with a single wall.

For the CNTs 11a constituting the CNT element wires etcetera 11, the CNT 11a having a double-walled structure is a three-dimensional mesh structure body in which two cylindrical bodies T1 and T2 each having a mesh structure with hexagonal lattices are substantially coaxially arranged, and is called a DWNT (double-walled nanotube). Each of the hexagonal lattices which are structure units is a six-membered ring at the vertices of which carbon atoms are arranged, and these are continuously connected such that one six-membered ring is adjacent to another.

Nature of the CNTs 11a constituting the CNT element wires etcetera 11 depends on chiralities of the aforementioned cylindrical bodies. The chiralities are roughly categorized into an armchair form, a zigzag form and a chiral form, the armchair form exhibits behavior of metal nature, the zigzag form that of semiconductor nature and semimetal nature, and the chiral form that of semiconductor nature and semimetal nature. Accordingly, electroconductivity of the CNT 11a largely changes depending on which chirality the cylindrical body has. In each of the CNT element wires etcetera 11 constituting the CNT wire 10 of the coated carbon nanotube wire 1 for a coil, it is preferable to increase a proportion of the CNTs 11a in the armchair form exhibiting the behavior of metal nature in view of further improving the electroconductivity.

Next, orientation of the CNTs 11a and the CNT element wires etcetera 11 in the CNT wire 10 is described. When information of an X-ray scattering image on the CNT wire 10 is analyzed using small-angle X-ray scattering (SAXS), it is found that the plurality of CNTs 11a, 11a, . . . and the plurality of CNT element wires etcetera 11, 11, . . . have excellent orientation in the CNT wire 10. Since the plurality of CNTs 11a, 11a, . . . and the plurality of CNT element wires etcetera 11, 11, . . . have excellent orientation as above, the CNT wire 10 has excellent electroconductivity along the longitudinal directions of the CNTs 11a and the CNT element wires etcetera 11. Namely, by the CNT element wires etcetera 11 having orientation in the longitudinal direction, the CNT element wires etcetera 11 have characteristics that electroconductivity in the longitudinal direction is more excellent than electroconductivity in a radial direction. The CNT wire 10 obtained by the plurality of CNT element wires etcetera 11 being twisted together is excellent in electroconductivity in the longitudinal direction, and electroconductivity between the CNT element wires etcetera 11 twisted together is low. Accordingly, as compared with a wire for a coil, composed of a metal-made twisted wire, the CNT wire 10 of the coated CNT wire 1 for a coil achieves more excellent electroconductivity in the longitudinal direction while more restraining electroconductivity in the radial direction. According to the above, the CNT wire 10 can obtain more excellent high frequency characteristics than a metal-made twisted wire.

Moreover, since the CNT wire 10 of the coated CNT wire 1 for a coil achieves more excellent electroconductivity in the longitudinal direction than in the radial direction, it is not needed to coat the individual CNT element wires etcetera 11 with insulating coating layers in the CNT wire 10. Hence, the CNT element wires etcetera 11 can be twisted together in a mode where a CNT element wire etcetera 11 directly contacts adjacent others in the CNT wire 10. Since the CNT element wires etcetera 11 are twisted together in a mode where a CNT element wire etcetera 11 directly contacts adjacent others in the CNT wire 10 as above, the coated CNT wire 1 for a coil can more improve the lamination factor of conductors than a wire for a coil, composed of a metal-made twisted wire. Moreover, since it is not needed to form an insulating coating layer on each CNT element wire etcetera 11 in the CNT wire 10, production costs can be reduced.

Since for the CNT wire 10 in a form of a twisted wire, excellent high frequency characteristics and a high lamination factor of conductors can be obtained as above while eddy currents are reduced, the coated carbon nanotube wire 1 for a coil can achieve high-power characteristics while reducing eddy currents to reduce a current loss.

The number of CNT element wires etcetera 11 twisted together for one CNT wire 10 is not specially limited, for example, several CNT element wires etcetera 11 to thousands of those are employed, more specifically, the number is preferably 2 to 5000 in view of formation of the twisted wire being easy while eddy currents being more securely reduced, and is still preferably 10 to 1000 in view of obtaining excellent high-power characteristics by more improving high frequency characteristics, and particularly preferably 300 to 600.

An equivalent circle diameter of the CNT wire 10 is not specially limited and is preferably not smaller than 0.01 mm and not larger than 5.0 mm in view of conduction of large current by means of wire thickening and ease of winding, still preferably not smaller than 0.05 mm and not larger than 2.0 mm in view of obtaining excellent high-power characteristics by improving both high frequency characteristics and the lamination factor, and particularly preferably not smaller than 0.30 mm and not larger than 1.0 mm.

A twisting number of the CNT wire 10 is not specially limited and is preferably not less than 1 T/m and not more than 1000 T/m in view of ease of formation of a twisted wire and winding, still preferably not less than 10 T/m and not more than 800 T/m in view of obtaining excellent high-power characteristics by improving both high frequency characteristics and the lamination factor of conductors, further preferably not less than 50 T/m and not more than 500 T/m in view of further excellent high frequency characteristics, and particularly preferably not less than 50 T/m and not more than 300 T/m in view of further obtaining an excellent allowable current.

A density in the CNT wire 10 is not specially limited and, for example, is preferably not lower than 0.50 g/cm$^3$ and not higher than 2.5 g/cm$^3$ in view of formation of a twisted wire being easy while improving electroconductivity in the longitudinal direction, still preferably not lower than 1.2 g/cm$^3$ and not higher than 1.8 g/cm$^3$ in view of obtaining excellent high-power characteristics by more improving the lamination factor of conductors, particularly preferably not lower than 1.2 g/cm$^3$ and not higher than 1.5 g/cm$^3$ in view of obtaining a further excellent allowable current, and still preferably not lower than 1.4 g/cm$^3$ in view of improving the lamination factor. Moreover, a density of the CNT element wires etcetera 11 is not specially limited and, for example, is preferably not lower than 1.0 g/cm$^3$ and not higher than 3.0 g/cm$^3$ in view of improvement of electroconductivity in the longitudinal direction and excellence of productivity of the CNT element wires etcetera 11, still preferably not lower than 1.1 g/cm$^3$ and not higher than 1.8 g/cm$^3$, particularly preferably 1.5 g/cm$^3$ to 1.8 g/cm$^3$ in view of easily obtaining an excellent allowable current.

Next, the coating layer 21 coating the external surface of the CNT wire 10 used for the coated CNT wire 1 for a coil is described.

As the coating layer 21, an insulating coating layer can be cited. As a material of the insulating coating layer, a material used for an insulating coating layer of a coated electric wire with a metal used as a core wire can be used, and, for example, a thermoplastic resin and a thermosetting resin can be cited. As the thermoplastic resin, for example, polytetrafluoroethylene (PTFE), polyethylene, polypropylene, polyacetal, polystyrene, polycarbonate, polyamide, polyvinyl chloride, polymethyl methacrylate, polyurethane and the like can be cited. As the thermosetting resin, for example, polyimide, phenol resin and the like can be cited. One of these may be solely used, or two or more kinds of these may be properly mixed and used.

The coating layer 21 may be set to be one layer as shown in FIG. 1, or may include two or more layers instead. Moreover, a layer of thermosetting resin may be further provided between the external surface of the CNT wire 10 and the coating layer 21 as needed.

Next, an exemplary method for manufacturing the coated carbon nanotube wire 1 for a coil according to an embodiment of the present disclosure is described. For the coated carbon nanotube wire 1 for a coil, first, the CNTs 11a are manufactured, and the CNT element wires etcetera 11 are manufactured from the obtained plurality of CNTs 11a. Next, a plurality of CNT element wires etcetera 11 are twisted together to manufacture the CNT wire 10. Next, the peripheral surface of the CNT wire 10 is coated with the coating layer 21 (for example, an insulating coating layer), and thereby, the coated carbon nanotube wire 1 for a coil can be manufactured.

The CNTs 11a can be prepared by a method such, for example, as a floating catalyst method (Japanese Patent No. 5819888) and a substrate method (Japanese Patent No. 5590603). The CNT element wire etcetera 11 can be prepared, for example, by dry spinning (Japanese Patent No. 5819888, Japanese Patent No. 5990202 or Japanese Patent No. 5350635), wet spinning (Japanese Patent No. 5135620, Japanese Patent No. 5131571 or Japanese Patent No. 5288359), liquid crystal spinning (Japanese Translation of PCT International Application Publication No. 2014-530964), or the like.

For a method of coating the peripheral surface of the CNT wire 10 obtained as above with the coating layer 21, a method of coating a core wire of aluminum or copper with an insulating coating layer can be used. For example, a method of melting a thermoplastic resin which is a raw material of the coating layer 21 and extruding it onto the periphery of the CNT wire 10 to coat the CNT wire 10, and thereby, to form the coating layer 21 can be cited.

The coated carbon nanotube wire 1 for a coil according to an embodiment of the present disclosure is used as a wire for preparing a coil by being wound into windings. A coil 50 having the coated carbon nanotube wire 1 for a coil as the windings can be used for various electric devices such as a motor and a transformer, for example.

Figure 3:
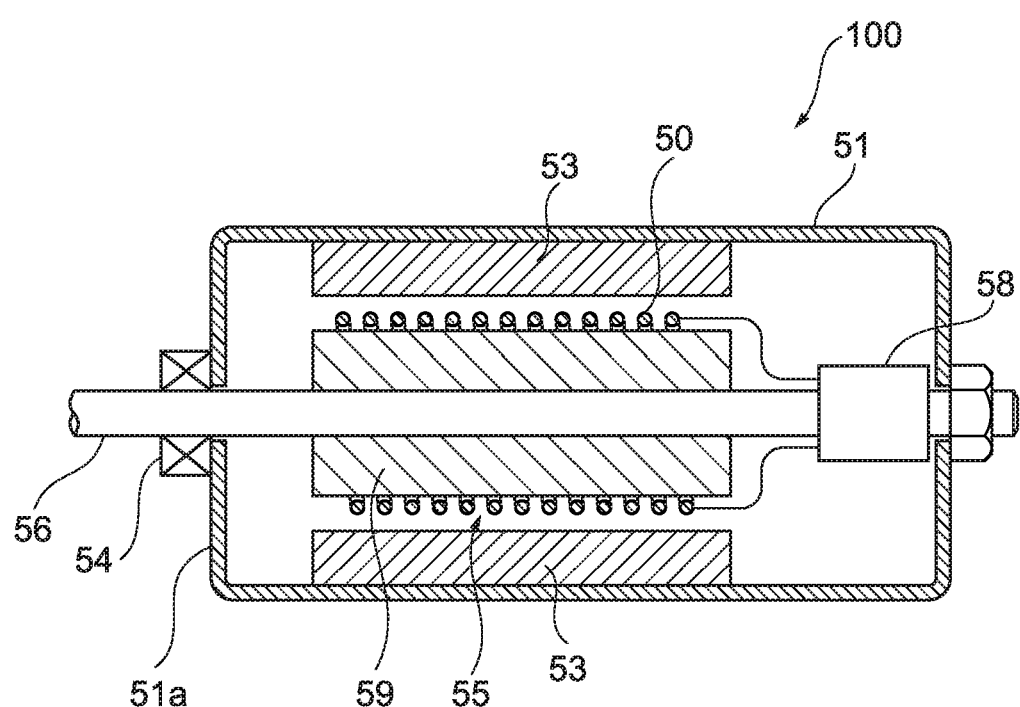
FIG. 3 An explanatory view showing an outline in which a coated carbon nanotube wire for a coil according to an embodiment of the present disclosure is used for a motor.

A motor using the coil 50 obtained as windings by winding the coated carbon nanotube wire 1 for a coil into a spiral shape is herein exemplarily described with use of the drawing. A structure of the motor is not specially limited, as exemplarily shown as an outline of a motor 100 in FIG. 3, the motor 100 has a hollow cylinder-shaped metal-made casing 51, a permanent magnet 53 is bonded onto an inner peripheral surface of the casing 51, and a bearing 54 is attached to a center of a closing portion 51a of the metal-made casing 51. Moreover, a rotor 55 freely rotatably supported is attached inside the metal-made casing 51.

The rotor 55 has a rotary shaft 56 one end of which passes through the bearing 54 at the closing portion 51a of the metal-made casing 51, the coil 50 attached to the rotary shaft 56 and housed in the metal-made casing 51, and a commutator 58 attached near another end of the rotary shaft 56. The coil 50 is configured by the coated carbon nanotube wire 1 for a coil being wound on an iron core 59 which the rotary shaft 56 penetrates.

Since the coil 50 using the coated carbon nanotube wire 1 for a coil of the present disclosure can reduce eddy currents arising in the iron core 59 and can obtain excellent high frequency characteristics and an excellent lamination factor of conductors, the motor 100 excellent in high-power characteristics can be obtained.

EXAMPLES

While some of examples of the present disclosure are next described, they are not limited to the examples below as long as they are within the spirit of the present disclosure.

Examples 1 to 22 and Comparative Examples 1 and 2

Method for Manufacturing CNT Wires of Examples 1 to 22

First, CNT element wires (single wires) with equivalent circle diameters as presented in Table 1 below were obtained by a dry spinning method (Japanese Patent No. 5819888) of directly spinning CNTs or a method of wet spinning of them (Japanese Patent No. 5135620, Japanese Patent No.

5131571 or Japanese Patent No. 5288359) prepared by the floating catalyst method. Next, CNT element wires were twisted together at the number for a twisted wire and at the twisting number as presented in Table 1 below to obtain a CNT wire (twisted wire).

Method for Coating External Surface of CNT Wire with Coating Layer (Insulating Coating Layer)

An insulating coating layer was formed by performing extrusion coating on the periphery of the conductors using a typical extruder for electric wire production using a polypropylene resin to prepare a coated CNT wire for a coil used for an example of Table 1 below.

Wires for a Coil of Comparative Examples 1 and 2

A copper wire as a single wire as presented in Table 1 below (Comparative Example 1), and a copper Litz wire obtained by twisting together at the number for the twisted wire and at the twisting number as presented in Table 1 below (Comparative Example 2) were used. Note that in Comparative Example 1, an insulating coating layer was formed on the copper wire as a single wire by performing extrusion coating on the periphery of the copper wire using a typical extruder for electric wire production using a polypropylene resin. In Comparative Example 2, after an insulating coating layer was formed on each of the copper wires constituting the copper Litz wire similarly to the above, the insulating coating copper wires were twisted together to prepare the copper Litz wire.

Measurement of Twisted Wire Density

A coated carbon nanotube wire was cut along a plane perpendicular to the longitudinal direction, and the cross section was observed by a scanning electron microscope (SEM). The area of the portion, of the twisted wire, not including the coating was set to be S1, the area occupied by the CNT element wires out of S1 was set to be S2, and the area of the portion of the gaps was set to be S3. S1=S2+S3 is herein completed. A density d(twisted wire) for the twisted wire was calculated by the expression below, where a density of the element wire mentioned later was d(element wire).

d(twisted wire)=d(element wire)×S2/S1

Measurement of Element Wire Density

The density was measured using the element wire that was 2 cm long by a density gradient tube-method direct-reading specific gravity meter (Shibayama Scientific Co., Ltd.).

Evaluations below were performed for samples of the wires for a coil, prepared as above.

(a) High Frequency Characteristics

For each of the wires of the examples and the wires of the comparative examples, an impedance (Z1) at 1 Hz and an impedance (Z2) at 1 MHz were measured by an impedance analyzer IM3570 (Hioki E.E. Corporation) to evaluate high frequency characteristics based on the following criteria.

"Excellent": ratio of Z2/Z1 is less than 2.0

"Good": ratio of Z2/Z1 is not less than 2.0 and not more than 10

"Poor": ratio of Z2/Z1 is more than 10

(b) Ratio of Area of Conductors Occupying in Cross Section in Radial Direction for Coil (Lamination Factor)

Using each of the wires of the examples and the wires of the comparative examples, a coil was prepared by hand-winding it on a columnar iron-made core with 10 mm of diameter at a fixed speed into five-layer windings with 10 mm of width such that no gaps arose on the wire. After the obtained coil was entirely solidified with an epoxy resin, the coil was separated into four along two planes an angle formed by which was 90° and both of which passed through the center axis of the core, and from observation of the cross sections with an optical microscope, the lamination factor (lamination factor (%)=(sum of the sectional areas of the portions of conductors)/(sectional area of the coil)×100) is obtained to calculate the mean value for the four cross sections, thereby, to obtain the lamination factor for the coil. The lamination factors were evaluated based on the following criteria.

"Excellent": higher than 80%

"Good": not lower than 50% and not higher than 80%

"Poor": lower than 50%

(c) Eddy Current Reduction Characteristics For each of the coils prepared by the method described in (b), core losses ($P_{fe}$) were measured at alternating currents at five levels of 10 kHz, 50 kHz, 100 kHz, 500 kHz and 1 MHz by the method described in JIS C 4034-2-1. The frequencies (f), frequencies, and $P_{fe}/f$ were plotted on the axis of abscissas, the axis of ordinates, and the axis of ordinates, respectively, to calculate an inclination α.

A ratio $\alpha/\alpha_{Cu}$ relative to an inclination $\alpha_{Cu}$ obtained by performing the similar measurement for a single wire of copper with the same diameter was calculated to evaluate eddy current reduction characteristics based on the following criteria.

"Excellent": $\alpha/\alpha_{Cu}$ is not less than 10

"Good": $\alpha/\alpha_{Cu}$ is not less than 3 and less than 10

"Poor": $\alpha/\alpha_{Cu}$ is less than 3

(d) Allowable Current

Through each of 5 cm of the wires of the examples and 5 cm of the wires of the comparative examples, a current was gradually being elevated and caused to flow with a source meter (Tektronix, Inc. (Keithley Instruments)) and a current value at which the red heat wire broke was measured to regard this as an allowable current. From the obtained value of the allowable current, an allowable current per unit sectional area was calculated and evaluated based on the following criteria.

"Excellent": not smaller than 30 A/mm$^2$

"Good": not smaller than 15 A/mm$^2$ and smaller than 30 A/mm$^2$

"Poor": smaller than 15 A/mm$^2$

Results of the high frequency characteristics, the lamination factor, the eddy current reduction characteristics and the allowable current are presented in Table 1 below. Note that when at least any one evaluation result of the high frequency characteristics and the lamination factor was "Excellent" or evaluation results of the high frequency characteristics and the lamination factor were both "Good" or better, it was determined that the high-power characteristics that the present disclosure had targeted were to be obtained.

TABLE 1

| | Equivalent Circle Diameter of Element Wire (mm) | The Number of Twisted Wires | Twisting Number (T/m) | Twisted Wire Density (g/cm3) | Element Wire Density (g/cm3) | High Frequency Characteristics | Lamination Factor | Eddy Current Reduction Characteristic | Allowable Current |
|---|---|---|---|---|---|---|---|---|---|
| Example 1 | 0.1 | 18 | 20 | 1.3 | 1.8 | Excellent | Good | Good | Excellent |
| Example 2 | 0.1 | 18 | 100 | 1.5 | 1.8 | Excellent | Excellent | Good | Excellent |
| Example 3 | 0.1 | 18 | 500 | 1.7 | 1.8 | Excellent | Excellent | Excellent | Good |
| Example 4 | 0.1 | 18 | 600 | 1.7 | 1.8 | Good | Excellent | Excellent | Good |
| Example 5 | 0.1 | 18 | 20 | 0.8 | 1.3 | Good | Good | Good | Good |
| Example 6 | 0.1 | 18 | 100 | 1.0 | 1.3 | Excellent | Good | Good | Good |
| Example 7 | 0.1 | 18 | 100 | 1.2 | 1.5 | Excellent | Good | Good | Excellent |
| Example 8 | 0.1 | 18 | 800 | 1.4 | 1.5 | Good | Excellent | Good | Excellent |
| Example 9 | 0.2 | 74 | 20 | 1.3 | 1.8 | Excellent | Good | Good | Excellent |
| Example 10 | 0.2 | 74 | 100 | 1.5 | 1.8 | Excellent | Excellent | Excellent | Excellent |
| Example 11 | 0.2 | 74 | 500 | 1.7 | 1.8 | Excellent | Excellent | Excellent | Good |
| Example 12 | 0.2 | 74 | 600 | 1.7 | 1.8 | Good | Excellent | Excellent | Good |
| Example 13 | 0.5 | 460 | 20 | 1.3 | 1.8 | Excellent | Good | Excellent | Excellent |
| Example 14 | 0.5 | 460 | 100 | 1.5 | 1.8 | Excellent | Excellent | Excellent | Excellent |
| Example 15 | 0.5 | 460 | 500 | 1.7 | 1.8 | Excellent | Excellent | Excellent | Good |
| Example 16 | 0.5 | 460 | 600 | 1.7 | 1.8 | Good | Excellent | Excellent | Good |
| Example 17 | 1.6 | 4710 | 20 | 1.2 | 1.8 | Excellent | Good | Excellent | Excellent |
| Example 18 | 1.6 | 4710 | 100 | 1.3 | 1.8 | Excellent | Good | Excellent | Excellent |
| Example 19 | 1.6 | 4710 | 500 | 1.5 | 1.8 | Excellent | Excellent | Excellent | Excellent |
| Example 20 | 1.6 | 4710 | 600 | 1.5 | 1.8 | Good | Excellent | Excellent | Excellent |
| Example 21 | 0.2 | 74 | 5 | 1.2 | 1.8 | Excellent | Good | Good | Excellent |
| Example 22 | 0.1 | 7 | 100 | 1.4 | 1.8 | Poor | Excellent | Good | Excellent |
| Comparative Example 1 (Copper Wire) | 0.2 | Single Wire | — | — | 8.9 | Poor | Good | Poor | Poor |
| Comparative Example 2 (Copper Litz Wire) | 0.2 | 74 | 100 | — | — | Good | Poor | Poor | Poor |

As presented in Table 1, it was found that in the examples for the coated CNT wires for a coil using the CNT wires obtained by twisting the CNT element wires together, at least any one evaluation result of the high frequency characteristics and the lamination factor was "Excellent" or evaluation results of the high frequency characteristics and the lamination factor were both "Good" or better and high-power characteristics was obtained. Furthermore, it was found that since in the examples using the CNT wires which were twisted wires of CNT element wires as conductors, eddy currents could be reduced, a current loss could be restrained.

In particular, in Examples 1 to 21 in which the numbers of twisted CNT element wires were 18 to 4710, it was found that evaluations of the high frequency characteristics were "Good" or better and more excellent high-power characteristics were obtained. Moreover, it was found that in Examples 2 to 4, 8, 10 to 12, 14 to 16, 19, 20 and 22 in which the twisting numbers of the CNT wires were 100 T/m to 800 T/m and the element wire densities were 1.8 g/cm$^3$, the lamination factors of conductors were improved to be "Excellent" and more excellent high-power characteristics were obtained. Moreover, when the element wire density was 1.5 g/cm$^3$ to 1.8 g/cm$^3$, by setting the twisting number to be not less than 5 T/m and less than 500 T/m, an excellent allowable current value could be securely obtained. Furthermore, in Examples 1 to 21 in which the numbers of twisted CNT element wires were 18 to 4710 and the twisting numbers of the CNT wires were 5 T/m to 800 T/m, it was found that both of the high frequency characteristics and the lamination factor were "Good" or better and further excellent high-power characteristics were obtained.

Moreover, in Examples 2 to 4, 8, 10 to 12, 14 to 16, 19, 20 and 22 in which the densities of the CNT wires were 1.4 g/cm$^3$ to 1.7 g/cm$^3$, it was found that by improving the lamination factors of conductors to be "Excellent", excellent high-power characteristics were obtained. Moreover, in Examples 1, 2, 7 to 10, 13, 14 and 17 to 22 in which the densities of the CNT wires were 1.2 g/cm$^3$ to 1.5 g/cm$^3$, the evaluations of the allowable current were "Excellent" and excellent allowable current values could be obtained.

On the other hand, in Comparative Example 1 using a copper wire as a single wire, it was found that since the high frequency characteristics were not obtained and the lamination factor was limited to the "Good" evaluation, high-power characteristics could not be obtained. Furthermore, in Comparative Example 1 using the copper wire which was a single wire as a conductor, eddy currents could not be sufficiently reduced. Moreover, in Comparative Example 2 using a Litz wire obtained by twisting copper wires together, it was found that since the lamination factor could not be obtained and the high frequency characteristics were limited to the "Good" evaluation, high-power characteristics could not be obtained. Furthermore, in Comparative Examples 1 and 2, the allowable current values were smaller than 15 A/mm$^2$ and good allowable currents could not be obtained.

What is claimed is:

1. A coated carbon nanotube wire for a coil, comprising:
   a carbon nanotube wire, the carbon nanotube wire being composed of a plurality of carbon nanotube aggregates each constituted of a plurality of carbon nanotubes, or being composed of a plurality of carbon nanotube element wires each constituted of a plurality of carbon nanotubes; and
   a coating layer coating the carbon nanotube wire, wherein each of the carbon nanotube aggregates contacts one or more other adjacent carbon nanotube aggregates, or each of the carbon nanotube element wires contacts one or more other adjacent carbon nanotube element wires, and wherein a twisting number of the carbon nanotube wire is not less than 1 T/m and not more than 1000 T/m.

2. The coated carbon nanotube wire for a coil according to claim 1, wherein a twisted wire density in the carbon nanotube wire is 0.5 g/cm³ to 2.5 g/cm³.

3. The coated carbon nanotube wire for a coil according to claim 2, wherein a density of the carbon nanotube aggregates or the carbon nanotube element wires in the carbon nanotube wire is 1.1 g/cm³ to 1.8 g/cm³.

4. The coated carbon nanotube wire for a coil according to claim 2, wherein the twisted wire density in the carbon nanotube wire is 1.2 g/cm³ to 1.5 g/cm³.

5. The coated carbon nanotube wire for a coil according to claim 2, wherein the number of the carbon nanotube aggregates or the carbon nanotube element wires constituting the carbon nanotube wire is 10 to 1000.

6. The coated carbon nanotube wire for a coil according to claim 1, wherein a density of the carbon nanotube aggregates or the carbon nanotube element wires in the carbon nanotube wire is 1.1 g/cm³ to 1.8 g/cm³.

7. The coated carbon nanotube wire for a coil according to claim 6, wherein the density of the carbon nanotube aggregates or the carbon nanotube element wires in the carbon nanotube wire is 1.5 g/cm³ to 1.8 g/cm³.

8. The coated carbon nanotube wire for a coil according to claim 6, wherein the number of the carbon nanotube aggregates or the carbon nanotube element wires constituting the carbon nanotube wire is 10 to 1000.

9. The coated carbon nanotube wire for a coil according to claim 1, wherein the number of the carbon nanotube aggregates or the carbon nanotube element wires constituting the carbon nanotube wire is 10 to 1000.

10. The coated carbon nanotube wire for a coil according to claim 1, wherein the number of the carbon nanotube aggregates or the carbon nanotube element wires constituting the carbon nanotube wire is 300 to 600.

11. The coated carbon nanotube wire for a coil according to claim 1, wherein an equivalent circle diameter of the carbon nanotube wire is not smaller than 0.05 mm and not larger than 2.0 mm.

12. The coated carbon nanotube wire for a coil according to claim 1, wherein an equivalent circle diameter of the carbon nanotube wire is not smaller than 0.30 mm and not larger than 1.0 mm.

13. The coated carbon nanotube wire for a coil according to claim 1, wherein the twisting number of the carbon nanotube wire is not less than 10 T/m and not more than 800 T/m.

14. A coil using a winding of the coated carbon nanotube wire for a coil according to claim 1.

15. A method for manufacturing a coated carbon nanotube wire coil, comprising:
 a step of preparing a carbon nanotube wire from a plurality of carbon nanotube element wires;
 a step of preparing a coated carbon nanotube wire by coating the carbon nanotube wire with a coating material; and
 a step of winding the coated carbon nanotube wire into a winding, wherein a twisting number of the carbon nanotube wire is not less than 1 T/m and not more than 1000 T/m.

16. The method for manufacturing a coated carbon nanotube wire coil according to claim 15, wherein an equivalent circle diameter of the carbon nanotube wire is not smaller than 0.05 mm and not larger than 2.0 mm.

17. A method for manufacturing a coated carbon nanotube wire coil, comprising:
 a step of coating, with a coating material, a carbon nanotube wire composed of carbon nanotube aggregates each constituted of a plurality of carbon nanotubes or carbon nanotube element wires each constituted of a plurality of carbon nanotubes to prepare a coated carbon nanotube wire; and
 a step of winding the coated carbon nanotube wire into a winding, wherein a twisting number of the carbon nanotube wire is not less than 1 T/m and not more than 1000 T/m.

18. The method for manufacturing a coated carbon nanotube wire coil according to claim 17, wherein the number of the carbon nanotube aggregates or the carbon nanotube element wires which are to be twisted together is 10 to 1000.

* * * * *